(12) United States Patent
Sanders et al.

(10) Patent No.: US 10,587,188 B2
(45) Date of Patent: Mar. 10, 2020

(54) RESONANT PULSED VOLTAGE MULTIPLIER AND CAPACITOR CHARGER

(71) Applicant: Transient Plasma Systems, Inc., Torrance, CA (US)

(72) Inventors: Jason M. Sanders, Los Angeles, CA (US); Mark Thomas, Redondo Beach, CA (US); Patrick Ford, Redondo Beach, CA (US)

(73) Assignee: TRANSIENT PLASMA SYSTEMS, INC., Torrance, CA (US)

( * ) Notice: Subject to any disclaimer, the term of this patent is extended or adjusted under 35 U.S.C. 154(b) by 0 days.

(21) Appl. No.: 16/254,146

(22) Filed: Jan. 22, 2019

(65) Prior Publication Data

US 2019/0229615 A1    Jul. 25, 2019

Related U.S. Application Data

(60) Provisional application No. 62/620,289, filed on Jan. 22, 2018.

(51) Int. Cl.
| | | |
|---|---|---|
| *H02M 3/07* | (2006.01) | |
| *H02M 3/156* | (2006.01) | |
| *H02M 1/00* | (2006.01) | |

(52) U.S. Cl.
CPC ............. *H02M 3/07* (2013.01); *H02M 3/156* (2013.01); *H02M 2001/007* (2013.01); *H02M 2001/0058* (2013.01)

(58) Field of Classification Search
CPC combination set(s) only.
See application file for complete search history.

(56) References Cited

U.S. PATENT DOCUMENTS

| | | |
|---|---|---|
| 3,832,568 A | 8/1974 | Wang |
| 4,433,669 A | 2/1984 | Ishikawa et al. |
| 4,677,960 A | 7/1987 | Ward |
| 5,157,267 A | 10/1992 | Shirata et al. |
| 5,563,780 A | 10/1996 | Goad |
| 6,235,249 B1 | 5/2001 | Chen |
| 6,317,341 B1 | 11/2001 | Fraidlin et al. |
| 6,426,666 B1 | 7/2002 | Li et al. |
| 6,633,017 B1 | 10/2003 | Drummond et al. |
| 6,831,377 B2 | 12/2004 | Yampolsky et al. |

(Continued)

FOREIGN PATENT DOCUMENTS

| | | |
|---|---|---|
| CN | 105207256 A | 12/2015 |
| CN | 105673139 A | 6/2016 |

(Continued)

OTHER PUBLICATIONS

International Search Report and Written Opinion for PCT/US2019/041228. dated Nov. 12, 2019, 10 pages.

(Continued)

*Primary Examiner* — An T Luu
(74) *Attorney, Agent, or Firm* — Cozen O'Connor (57) ABSTRACT

Systems and methods for quickly charging a load capacitance to a voltage level that is a multiple of the DC input voltage are provided herein. In one approach, the load capacitance is charged by a voltage multiplication circuit, and the load capacitance is subsequently discharged into a resonant circuit that drives a diode opening switch in order to create a fast rising, unipolar electrical pulse.

20 Claims, 4 Drawing Sheets

(56) References Cited

U.S. PATENT DOCUMENTS

| | | | |
|---|---|---|---|
| 6,906,280 | B2 | 6/2005 | Rosocha |
| 7,767,433 | B2 | 8/2010 | Kuthi et al. |
| 7,817,396 | B2 | 10/2010 | Tao et al. |
| 7,901,929 | B2 | 3/2011 | Kuthi et al. |
| 7,901,930 | B2 | 3/2011 | Kuthi et al. |
| 8,115,343 | B2 | 2/2012 | Sanders et al. |
| 8,120,207 | B2 | 2/2012 | Sanders et al. |
| 8,212,541 | B2 * | 7/2012 | Perreault ............... H02M 3/07 323/282 |
| 8,226,901 | B2 | 7/2012 | Makita et al. |
| 8,418,668 | B2 | 4/2013 | Shimizu |
| 8,854,019 | B1 * | 10/2014 | Levesque ............... H02M 3/07 323/266 |
| 8,908,401 | B2 | 12/2014 | Hiltbrunner et al. |
| 9,080,547 | B2 | 7/2015 | Shiraishi et al. |
| 9,617,965 | B2 | 4/2017 | Sanders et al. |
| 9,831,776 | B1 | 11/2017 | Jiang et al. |
| 10,072,629 | B2 | 9/2018 | Sanders et al. |
| 10,128,745 | B2 * | 11/2018 | Low ........................ H02M 3/07 |
| 2003/0116148 | A1 | 6/2003 | Sakakura |
| 2004/0182832 | A1 | 9/2004 | Rosocha |
| 2005/0218423 | A1 | 10/2005 | Shimizu et al. |
| 2005/0279337 | A1 | 12/2005 | Biljenga |
| 2006/0062074 | A1 | 3/2006 | Gundersen et al. |
| 2007/0031959 | A1 | 2/2007 | Kuthi et al. |
| 2007/0262721 | A1 | 11/2007 | Camilli |
| 2008/0231337 | A1 | 9/2008 | Krishnaswamy et al. |
| 2008/0274632 | A1 | 11/2008 | Lenfert et al. |
| 2009/0126668 | A1 | 5/2009 | Shiraishi et al. |
| 2009/0126684 | A1 | 5/2009 | Shiraishi et al. |
| 2010/0038971 | A1 | 2/2010 | Sanders et al. |
| 2010/0156195 | A1 | 6/2010 | Sanders et al. |
| 2011/0069514 | A1 | 3/2011 | Chiba |
| 2011/0267113 | A1 | 11/2011 | Carmon et al. |
| 2014/0109886 | A1 | 4/2014 | Singleton et al. |
| 2014/0230770 | A1 | 8/2014 | Kuthi et al. |
| 2014/0346875 | A1 | 11/2014 | Chinga et al. |
| 2015/0280553 | A1 | 10/2015 | Giuliano et al. |
| 2016/0069320 | A1 | 3/2016 | Idicheria et al. |
| 2016/0254754 | A1 | 9/2016 | Perreault et al. |
| 2018/0269793 | A1 | 9/2018 | Ahsanuzzaman et al. |
| 2019/0032623 | A1 | 1/2019 | Idicheria et al. |
| 2019/0229623 | A1 * | 7/2019 | Tsuda ..................... H02M 3/00 |
| 2019/0230779 | A1 | 7/2019 | Sanders et al. |

FOREIGN PATENT DOCUMENTS

| | | |
|---|---|---|
| JP | 2006081277 A | 3/2006 |
| JP | 2012184718 A | 9/2012 |
| JP | 2013144127 A | 7/2013 |
| KR | 10-1995-0003730 | 2/1995 |
| KR | 20100023304 A | 3/2010 |
| KR | 20100046734 A | 5/2010 |
| KR | 101846046 B1 | 4/2018 |
| WO | 2010011408 A1 | 1/2010 |
| WO | 2013134573 A1 | 9/2013 |
| WO | 2014066095 A1 | 5/2014 |
| WO | 2015095140 A1 | 6/2015 |
| WO | 2019143992 A1 | 7/2019 |
| WO | 2019144037 A1 | 7/2019 |

OTHER PUBLICATIONS

Gilbert, Richard A., "Novel Electrode Designs for Electrochemotherapy", Biochimica et Biophysica Acta 1334, 1997, pp. 9-14.
Extended European Search Report for European Application No. 09800737.0 dated Apr. 25, 2014 in 10 pages.
Hewlett Packard. Application Note 918, Pulse and Waveform Generation with Step Recovery Diodes. Oct. 1984. 28 pages.
International Search Report and Written Opinion for PCT/US2013/064955 dated Jan. 21, 2014 in 7 pages.
International Search Report and Written Opinion for PCT/US2019/014273 dated May 9, 2019 in 10 pages.
International Search Report and Written Opinion for PCT/US2019/014339 dated May 8, 2019 in 11 pages.
International Search Report for PCT/US2014/070518, dated Mar. 31, 2015, 2 pages.
International Search Report from PCT Application No. PCT/US2009/045073 dated Jan. 28, 2010 in 2 pages.
Kuthi, Andras, U.S. Appl. No. 61/767,044, filed Feb. 20, 2013, "Transient Plasma Electrode for Radical Generation." 7 pages.
Written Opinion for PCT/US2014/070518, dated Mar. 31, 2015, 4 pages.
Babaie, Meisam, et al., "Effect of Pulsed Power on Particle Matter in Diesel Engine Exhaust Using a DBD Plasma Reactor", IEEE Transactions on Plasma Science, vol. 41, No. 8; Aug. 2013, pp. 2349-2358.
Babaie, M., et al., "Influence of non-thermal plasma after-treatment technology on diesel engine particulate matter composition and NOx concentration", Int. J. Environ. Sci. Technol. 2016, vol. 13; pp. 221-230.
Barth, Rolf F., "Rat brain tumor models in experimental neuro-oncology: The 9L, C6, T9, F98, RG2 (D74), RT-2 and CNS-1 Gliomas", Journal of Neuro-Oncology, 1998; vol. 36, pp. 91-102.
Behrend, M.R. , et al., "Nanosecond Pulse Generator Using Fast Recovery Diodes for Cell Electromanipulation", IEEE Transactions on Plasma Science, IEEE Service Center, Piscataway, New Jersey; vol. 33, No. 4, Aug. 1, 2005, pp. 1192-1197.
Bier, Martin, et al., "Kinetics of Sealing for Transient Electropores in Isolated Mammalian Skeletal Muscle Cells", Bioelectromagnetics, vol. 20, 1999; pp. 194-201.
Borner, Markus M., et al., "The detergent Triton X-100 induces a death pattern in human carcinoma cell lines that resembles cytotoxic lymphocyte-induced apoptosis", FEBS Letters (1994), vol. 353, pp. 129-132.
Chae, J.-O. , "Non-thermal plasma for diesel exhaust treatment", Journal of Electrostatics, Slesvier Science B.V., vol. 57, 2003, pp. 251-262.
Chang, J.S. , "Physics and chemistry of plasma pollution control technology", Plasma Sources Science and Technology; IOP Publishing, vol. 17, 2008; pp. 1-6.
Chow, Judith C., et al., "Health Effects of Fine Particulate Air Pollution: Lines that Connect", Journal of the Air & Waste Management Association, 2006; vol. 56, No. 10, pp. 1368-1380.
Cole, M.J. et al., "Time-domain whole-field fluorescence lifetime imaging with optical sectioning", Journal of Microscopy, vol. 203, Pt 3, Sep. 2001, pp. 246-257.
Cossarizza, Andrea, et al., "Chapter 21: Analysis of Mitochondria during Cell Death", Methods in Cell Biology, vol. 63, 2001; pp. 467-486.
Craft, Cheryl M., et al., "PhLPs and PhLOPs in the Phosducin Family of G beta gamma Binding Proteins", Biochemistry, American Chemical Society, 1998; vol. 37, pp. 15758-15772.
Cubeddu, R. , et al., "Time-resolved fluorescence imaging in biology and medicine", Topical Review; Institute of Physics Publishing, Journal of Physics D: Applied Physics; vol. 35, 2002; pp. R61-R76.
Deangelis, Lisa M., "Brain Tumors", New England Journal of Medicine, Jan. 11, 2001; vol. 344, No. 2, pp. 114-123.
Debruin, Katherine A., et al., "Modeling Electroporation in a Single Cell. I. Effects of Field Strength and Rest Potential", Biophysical Journal, Sep. 1999; vol. 77, pp. 1213-1224.
Dockery, Douglas W., et al., "An Association Between Air Pollution and Mortality in Six U.S. Cities", The New England Journal of Medicine; Dec. 9, 1993; vol. 329, No. 24, pp. 1753-1759.
Frank, K. , et al., "High-Power Pseudospark and BLT Switches", IEEE Transactions on Plasma Science, European Organization for Nuclear Research, Apr. 1988; vol. 16, No. 2, pp. 317-323.
Freeman, Scott A., et al., "Theory of Electroporation of Planar Bilayer Membranes: Predictions of the Aqueous Area, Change in Capacitance, and Pore-Pore Separation", Biophysical Journal, Jul. 1994; vol. 67, pp. 42-56.

(56) References Cited

OTHER PUBLICATIONS

Garon, E.B., et al., 2007 In Vitro and In Vivo Evaluation and a Case Report of Intense Nanosecond Pulsed Electric Field as a Local Therapy for Human Malignancies. Int. J. Cancer, vol. 121: pp. 675-682.

Gotoh, Tomomi, et al., "Nitric Oxide-induced Apoptosis in Raw 264.7 Macrophages Is Mediated by Endoplasmic Reticulum Stress Pathway Involving ATF6 and CHOP", The Journal of Biological Chemistry, The American Society for Biochemistry and Molecular Biology, Inc.; 2002; vol. 277, No. 14, pp. 12343-12350.

Grekhov, I.V., et al., "Formation of nanosecond high-voltage drops across semiconductor diodes with voltage recovery by a drift mechanism", Soy. Tech. Phys. Lett., 1983; vol. 9, No. 4, pp. 188-189.

Grekhov, I.V., et al., "Nanosecond semiconductor diodes for pulsed power switching", Physics-Uspekhi, Russian Academy of Sciences, 2005; vol. 48, No. 7; pp. 703-712.

Grekhov, Igor V., et al., "Physical Basis for High-Power Semiconductor Nanosecond Opening Switches", IEEE Transactions on Plasma Science, Oct. 2000; vol. 28, No. 5, pp. 1540-1544.

Gundersen, M., et al., "Nanosecond Pulse Generator Using a Fast Recovery Diode", IEEE 26th Power Modulator Conference, 2004; pp. 603-606.

Gysel, Nicholas, et al., "Particulate matter emissions and gaseous air toxic pollutants from commercial meat cooking operations", Journal of Environmental Sciences; The Research Center for Eco-Environmental Sciences, Chinese Academy of Sciences; vol. 65, 2018, pp. 162-170.

Hackam, R., et al., "Air Pollution Control by Electrical Discharges", IEEE Transactions on Dielectrics and Electrical Insulation, vol. 7, No. 5, Oct. 2000, pp. 654-683.

Hemker, R.G., et al., "Development of a Parallel Code for Modeling Plasma Based Accelerators", Proceedings of the 1999 Particle Accelerator Conference, New York, 1999; pp. 3672-3674.

Joshi, R.P., et al., "Electroporation Dynamics in Biological Cells Subjected to Ultrafast Electrical Pulses: A Numerical Simulation Study", Physical Review E, vol. 62, No. 1; Jul. 2000; pp. 1025-1033.

Kaltsonoudis, Christos, et al., "Characterization of fresh and aged organic aerosol emissions from meat charbroiling", Atmospheric Chemistry and Physics, vol. 17, 2017; pp. 7143-7155.

Kirkman, George F., et al., "Low pressure, light initiated, glow discharge switch for high power applications", Appl. Phys. Lett.; American Institute of Physics, 1986; vol. 49, pp. 494-495.

Kotnik, Tadej, et al., "Theoretical Evaluation of the Distributed Power Dissipation in Biological Cells Exposed to Electric Fields", Bioelectromagnetics, vol. 21; 2000; pp. 385-394.

Kotov, Yu A., et al., "Novel nanosecond semiconductor opening switch for megavolt repetitive pulsed power technology: experiment and applications", In Proceedings of the 9th Int. IEEE Pulsed Power Conference, Albuquerque, NM, 1993; SPIE vol. 2374; pp. 98-103.

Kuroki, Tomoyuki, et al., "Single-Stage Plasma-Chemical Process for Particulates, Nox, and SOx Simultaneous Removal", IEEE Transactions on Industry Applications, vol. 38, No. 5, Sep./Oct. 2002, pp. 1204-1209.

Kuthi, A., et al., "Nanosecond pulse generator using a fast recovery diode", Power Modulator Symposium, 2004 and 2004 High-Voltage Workshop. Conference Record of the 26th International San Francisco, CA May 23-26, 2004; IEEE, pp. 603-606.

Lee, Jun-Bok, et al., "Emission Rate of Particulate Matter and Its Removal Efficiency by Precipitators in Under-Fired Charbroiling Restaurants", TheScientificWorldJournal, TSW Environment; 2011, vol. 11, pp. 1077-1088.

Li, Aimin, et al., "Gene Expression Networks Underlying Retinoic Acid-Induced Differentiation of Human Retinoblastoma Cells", Investigative Ophthalmology & Visual Science, Mar. 2003; vol. 44, No. 3, pp. 996-1007.

Li, Aimin, et al., "Retinoic Acid Upregulates Cone Arrestin Expression in Retinoblastoma Cells through a Cis Element in the Distal Promoter Region", Investigative Ophthalmology & Visual Science, May 2002; vol. 43, No. 5, pp. 1375-1383.

Lyubutin, S.K., et al., "Repetitive Nanosecond All-Solid-State Pulsers Based on SOS Diodes", Institute of Electrophysics; Russian Academy of Sciences, Ural Division; IEEE 11th International Pulsed Power conference, Baltimore, MD; pp. 992-998.

Marcu, Laura, et al., "Photobleaching of Arterial Fluorescent Compounds: Characterization of Elastin, Collagen and Cholesterol Time-resolved Spectra during Prolonged Ultraviolet Irradiation", Photochemistry and Photobiology, 1999; vol. 69, No. 6, pp. 713-721.

Marszalek, Piotr, et al., "Schwan equation and transmembrane potential induced by alternating electric field", Biophysical Journal, Oct. 1990; vol. 58, pp. 1053-1058.

Matsumoto, Takao, et al., "Energy Efficiency Improvement of Nitric Oxide Treatment Using Nanosecond Pulsed Discharge", IEEE Transactions on Plasma Science; vol. 38, No. 10, Oct. 2010; pp. 2639-2643.

Maytin, Edward V., et al., "Stress-Inducible Transcription Factor CHOP/gadd153 Induces Apoptosis in Mammalian Cells via p38 Kinase-Dependent and -Independent Mechanisms", Experimental Cell Research, 2001; vol. 267, pp. 193-204.

McDonald, Jacob D., et al., "Emissions from Charbroiling and Grilling of Chicken and Beer", Journal of the Air & Waste Management Association, 2003; vol. 53, No. 2, pp. 185-194.

Moll, John L., et al., "Physical Modeling of the Step Recovery Diode for Pulse and Harmonic Generation Circuits", Proceedings of the IEEE, Jul. 1969; vol. 57, No. 7, pp. 1250-1259.

Oberdorster, Gunter, et al., "Nanotoxicology: An Emerging Discipline Evolving from Studies of Ultrafine Particles", Environmental Health Perspectives, vol. 113, No. 7; Jul. 2005; pp. 823-839.

Perryman, Pamela, "Preliminary Draft Staff Report: Proposed Amended Rule 1138—Control of Emissions from Restaurant Operations", South Coast Air Quality Management District; Planning, Rule Development, and Area Sources, Aug. 2009, in 27 pages.

Pogue, Brian W., et al., "In Vivo NADH Fluorescence Monitoring as an Assay for Cellular Damage in Photodynamic Therapy", Photochemistry and Photobiology, 2001; vol. 74, No. 6, pp. 817-824.

Polevaya, Yulia, et al., "Time domain dielectric spectroscopy study of human cells II. Normal and malignant white blood cells", Biochimica et Biophysica Acta, 1999; vol. 1419, pp. 257-271.

Pope III, C. Arden, et al., "Lung Cancer, Cardiopulmonary Mortality, and Long-term Exposure to Fine Particulate Air Pollution", JAMA, Mar. 6, 2002; vol. 287, No. 9, pp. 1132-1141.

Rajanikanth, B.S., et al., "Discharge Plasma Treatment for NOx Reduction from Diesel Engine Exhaust: A Laboratory Investigation", IEEE Transactions on Dielectrics and Electrical Insulation, vol. 12, No. 1; Feb. 2005, pp. 72-80.

Rukin, S.N., "High-Power Nanosecond Pulse Generators Based on Semiconductor Opening Switches (Review)", Instruments and Experimental Techniques, 1999; vol. 42, No. 4, pp. 439-467.

Samet, Jonathan M., et al., "Fine Particulate Air Pollution and Mortality in 20 U.S. Cities, 1987-1994", The New England Journal of Medicine, Massachusetts Medical Society; Dec. 14, 2000; vol. 343, No. 24, pp. 1742-1749.

Sanders, J., et al., "Broadband Power Measurement of High-Voltage, Nanosecond Electric Pulses for Biomedical Applications", IEEE International Power Modulator Conference, Las Vegas, NV, 2008; pp. 350-353.

Schoenbach, Karl H., et al., "The Effect of Pulsed Electric Fields on Biological Cells: Experiments and Applications", IEEE Transactions on Plasma Science, Apr. 1997; vol. 25, No. 2, pp. 284-292.

Tang, Tao, et al., "Diode Opening Switch Based Nanosecond High Voltage Pulse Generators for Biological and Medical Applications", IEEE Transactions on Dielectrics and Electrical Insulation, Aug. 2007; vol. 14, No. 4; pp. 378-883.

Wakita, Masayoshi, et al., "Some Characteristics of the Fluorescence Lifetime of Reduced Pyridine Nucleotides in Isolated Mitochondria, Isolated Hepatocytes, and Perfused Rat Liver in Situ", J. Biochem., 1995; vol. 118, No. 6, pp. 1151-1160.

(56) References Cited

OTHER PUBLICATIONS

Wang, Fei, et al., "Solid-State High Voltage Nanosecond Pulse Generator", IEEE Pulsed Power Conference, Abstract No. #10123, pp. 1199-1202.
Watanabe, Kenji, et al., "Feasibility and limitations of the rat model by C6 gliomas implanted at the subcutaneous region", Neurological Research; Jul. 2002, vol. 24, No. 5; pp. 485-490.
Weaver, James C., et al., "Theory of electroporation: A review", Bioelectrochemistry and Bioenergetics, 1996; vol. 41, pp. 135-160.
Webb, S.E.D., et al., "A wide-field time-domain fluorescence lifetime imaging microscope with optical sectioning", Review of Scientific Instruments, Apr. 2002; vol. 73, No. 4, pp. 1898-1907.
Weiss, Arthur, et al., "The role of T3 surface molecules in the activation of human t cells: a two-stimulus requirement for IL 2 production reflects events occurring at a pre-translational level", The Journal of Immunology, vol. 133, No. 1; Jul. 1984, pp. 123-128.
Yancey, J.W.S., et al., "Cookery method and endpoint temperature can affect the Warner-Bratzler shear force, cooking loss, and internal cooked color of beef semimembranosus and infraspinatus steaks", J. Anim. Sci. 2016, vol. 94, pp. 4434-4446.
Zhu, Xuemei, et al., "Mouse cone arrestin gene characterization: promoter targets expression to cone photoreceptors", FEBS Letters, 2002; vol. 524, pp. 116-122.
Zhu, Xuemei, et al., "The Carboxyl Terminal Domain of Phosducin Functions as a Transcriptional Activator", Biochemical and Biophysical Research Communications, 2000; vol. 270, pp. 504-509.

\* cited by examiner

RESONANT PULSED VOLTAGE MULTIPLIER AND CAPACITOR CHARGER

STATEMENT OF GOVERNMENT INTEREST

This invention was made with government support under Contract Number FA9550-15-1-0051 awarded by the U.S. Air Force Office of Scientific Research. The government has certain rights in the invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to systems and methods to produce high voltage, high power nanosecond pulses, which may, for example, be advantageously employed in the generation of non-thermal plasmas. More particularly, the present disclosure relates to resonant pulsed voltage multiplier and capacitor charger circuits and methods.

BACKGROUND

Description of the Related Art

Capacitor charges are commonly used to charge a load capacitance to a pre-specified voltage level. In pulsed power applications that require a high pulse repetition rate (PRR), capacitors oftentimes need to be charged to high voltage very quickly, requiring high instantaneous power.

BRIEF SUMMARY

In order to increase the peak power of a capacitor charger, without requiring excessively high switching current, the present disclosure provides various embodiments of half-cycle, pulsed, resonant voltage multiplier circuits and methods capable of rapidly charging a capacitor.

Briefly and in general terms, the present disclosure is directed to a system for charging a load capacitor that is subsequently discharged into a resonant circuit that energizes an opening switch for the purpose of producing high voltage pulses with high instantaneous power. In the various embodiments provided by the present disclosure, a resonant pulsed voltage multiplier and capacitor charger charges the pulse generator circuitry that produces a high voltage, unipolar pulse, which may be used, for example, for generating non-equilibrated plasmas and/or pulsed electric fields.

In some embodiments, the resonant pulsed voltage multiplier and capacitor charger is directly powered by an available DC power source, and, depending on the desired attributes of the pulse, the DC power source may be adjustable between 0-1,200 VDC.

As disclosed herein, voltage multiplication is achieved by switching pre-charged capacitors in series. This is realized by individual voltage multiplying cells or stages that are appropriately connected to one another. The multiplication factor achieved is given by the number of individual voltage multiplying stages plus one.

In one or more embodiments, the present disclosure provides a method that includes supplying a DC charging voltage to a plurality of capacitors of a voltage multiplying circuit; and resonantly charging a load capacitor of a first resonant circuit that includes the load capacitor and a first inductor to a voltage that is an integer multiple of the DC charging voltage by selectively electrically coupling each of the capacitors of the voltage multiplying circuit in series with one another and with the load capacitor.

In another embodiment, the present disclosure provides a resonant pulsed voltage multiplier and capacitor charger that includes a charge circuit, a voltage multiplying circuit electrically coupled to the charge circuit, and a recharge circuit electrically coupled to the voltage multiplying circuit. The charge circuit includes a load capacitance and a charge circuit inductor electrically coupled to one another. The voltage multiplying circuit includes a plurality of voltage multiplying stages, and each of the plurality of voltage multiplying stages includes a capacitor and a first switch. The first switches of the plurality of voltage multiplying stages are operable to selectively electrically couple the capacitors of the plurality of voltage multiplying stages in series, and to selectively electrically couple the capacitors of the plurality of voltage multiplying stages in parallel. The recharge circuit includes a DC power supply that is operable to supply a DC charging voltage to the capacitors of the plurality of voltage multiplying stages.

The structures, articles and methods described herein can be advantageously employed in a variety of different applications. For example, the structures, articles and methods described herein can be employed to generate pulsed power to produce a plasma, for instance a non-thermal plasma. Such can, for example, be advantageously used in applications involving pulsed power to improve efficiency of performance of combustion engines. For example, structures, articles and methods described herein may be implemented as part of, or in connection with a signal generating source that supplies pulsed power to a transient plasma circuit (e.g., via a standard ignition coil) that outputs at least one signal (e.g., an electrical pulse having a voltage and a current) that is destined to breakdown over a spark gap (e.g., the spark gap of a spark plug, a static spark gap, a rotary spark gap, and the like) at a first voltage. For example, the transient plasma circuit may be integrated into a spark plug or at any location between the signal generating source and the spark gap. The signal generating source may be integrated into the transient plasma circuit. Such can, for example, be advantageously used in applications involving pulsed power to treat textiles.

The foregoing summary does not encompass the claimed subject matter in its entirety, nor are the embodiments intended to be limiting. Rather, the embodiments are provided as mere examples.

The present disclosure addresses these and other needs.

Other features of the disclosed embodiments will become apparent from the following detailed description, taken in conjunction with the accompanying drawings, which illustrate, by way of example, the principles of the disclosed embodiments.

DETAILED DESCRIPTION

The present disclosure relates to circuits that are operable to quickly charge a load capacitance to a voltage level that is some multiple of the input DC voltage. In one or more embodiments, the load capacitance that is charged is the input capacitance of another subsequent circuit, such as a pulse generator circuit that generates a pulse based on a charge stored in the load capacitance.

Figure 1:
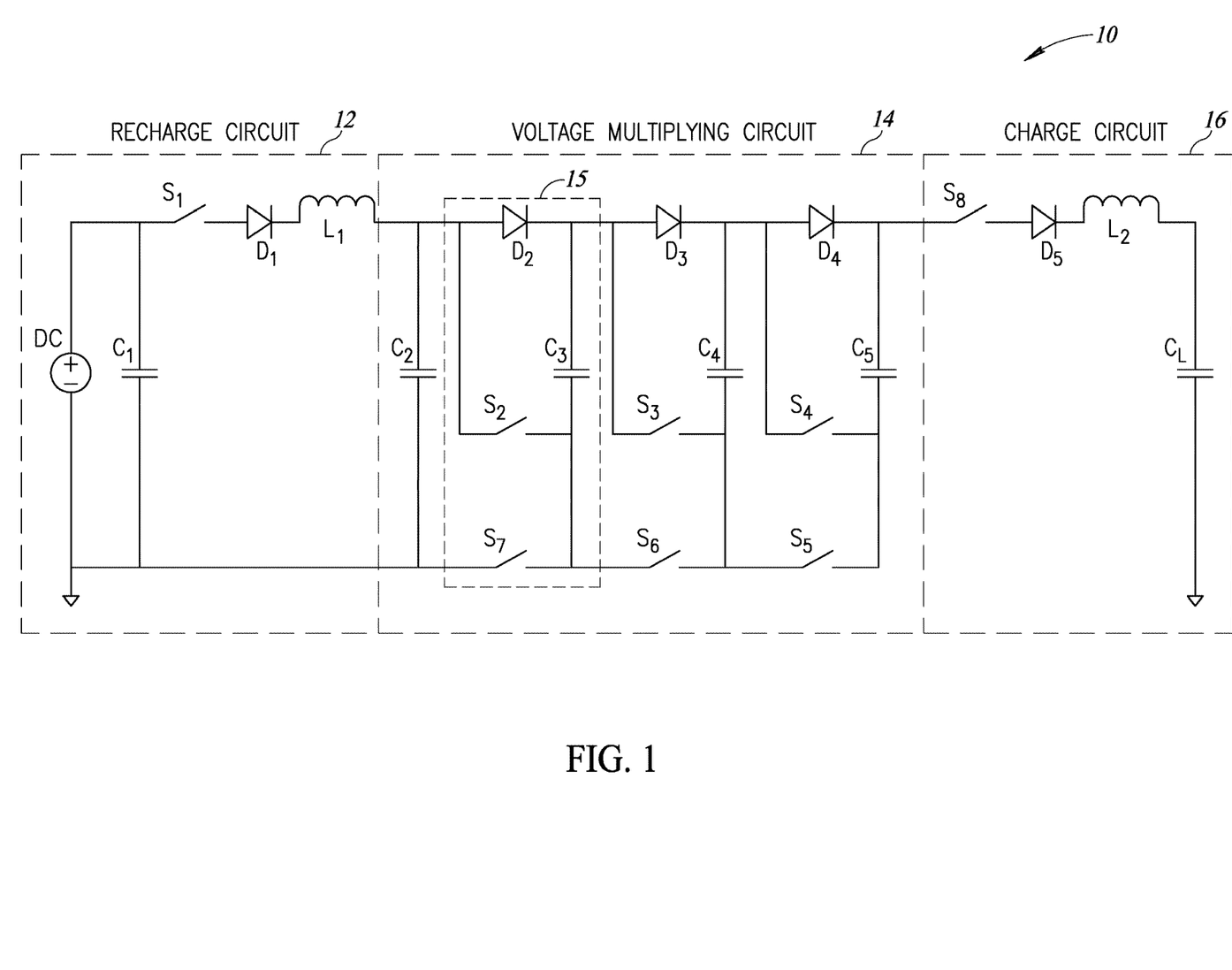
FIG. 1 is a high level schematic diagram, illustrating a resonant pulsed voltage multiplier and capacitor charger, in accordance with one or more embodiments.

FIG. 1 is a high level schematic diagram illustrating a resonant pulsed voltage multiplier and capacitor charger 10, in accordance with one or more embodiments. The resonant pulsed voltage multiplier and capacitor charger 10 includes a recharge circuit 12, a voltage multiplying circuit 14, and a charge circuit 16. The charge circuit 16 charges a load capacitance $C_L$, the voltage multiplying circuit 14 multiplies an input DC voltage by a integer multiple "n", and the recharge circuit 12 recharges the capacitors of the voltage multiplying circuit 14.

The recharge circuit 12 includes a DC power supply 13 and a capacitor C1 electrically coupled to one another in parallel. The recharge circuit 12 further includes a rectifier, such as a diode D1, and an inductor L1 that may be selectively coupled, via a switch S1, to the DC power supply 13 and the capacitor C1.

Figure 3:
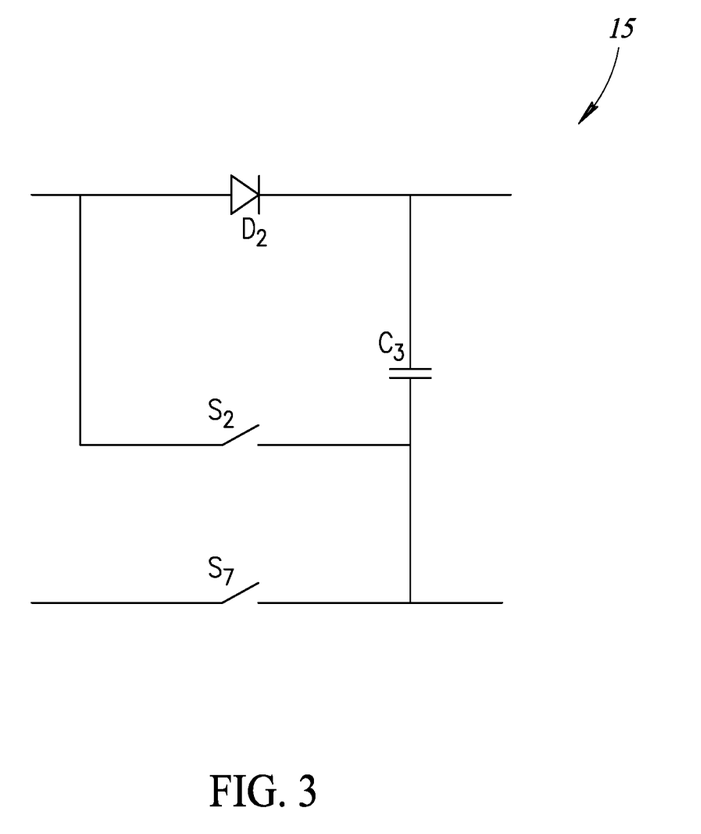
FIG. 3 is a schematic diagram illustrating a voltage multiplying stage, which may be included in a resonant pulsed voltage multiplier and capacitor charger, in accordance with one or more embodiments.

The voltage multiplying circuit 14 is electrically coupled to the recharge circuit 12 and to the charge circuit 16, and more particularly, the voltage multiplying circuit 14 is electrically coupled between the recharge circuit 12 and the charge circuit 16. The voltage multiplying circuit 14 includes an input capacitor $C_2$ and a plurality of voltage multiplying stages 15. Each of the voltage multiplying stages includes a respective diode $D_2$-$D_4$, a respective capacitor $C_2$-$C_5$, a respective first switch $S_2$-$S_4$, and a respective second switch $S_5$-$S_7$. FIG. 3 is a schematic diagram illustrating a single voltage multiplying stage 15 of the voltage multiplying circuit 14.

In operation, the capacitors $C_2$-$C_5$ of the voltage multiplying circuit 14 are initially charged to a DC voltage, as may be provided from the DC power supply 13. During charging of the capacitors $C_2$-$C_5$, the first switches $S_2$-$S_4$ are in a non-conducting state, and the second switches $S_5$-$S_7$ are in a conducting state.

The first switches $S_2$-$S_4$ of the voltage multiplying circuit 14 are simultaneously or concurrently triggered to transition from the non-conducting state to the conducting state, and the second switches $S_5$-$S_7$ are simultaneously or concurrently triggered to transition from the conducting state to the non-conducting state, at some time after the capacitors $C_2$-$C_5$ are suitably charged. At this time, the capacitors $C_2$-$C_5$ are connected in series through the conducting first switches $S_2$-$S_4$ and the diodes $D_2$-$D_4$ of the voltage multiplying circuit 14 are reverse biased. By connecting the capacitors $C_2$-$C_5$ in series, the voltage multiplying circuit 14 multiplies the DC charging voltage, e.g., provided from the DC power supply 13, by the number of cells or stages 15 in the voltage multiplying circuit 14 plus one, due to the charging voltage stored in the input capacitor $C_2$, which is in addition to the charging voltage stored in the capacitors $C_3$-$C_5$ of the voltage multiplying stages 15. In the implementation shown in FIG. 1, the multiplying factor is 4, as there are three voltage multiplying stages 15, and one input capacitor $C_2$; however, embodiments provided herein are not limited to this particular implementation, but instead may include more or less than three voltage multiplying stages, and more or less than one input capacitor.

Sometime after the first switches $S_2$-$S_4$ are triggered to operate in the conducting state, the switch $S_8$ of the charge circuit 16 is triggered to transition from a non-conducting state to a conducting state, at which time the load capacitor $C_L$ of the charge circuit 16 is resonantly charged by the series combination of $C_2$-$C_5$ through the charge circuit inductor $L_2$. The charge circuit 16 further includes a diode $D_5$ that acts as a rectifier, preventing charge from flowing back from the load capacitor $C_L$ into the capacitors $C_2$-$C_5$ of the voltage multiplying circuit 14. The charge circuit inductor $L_2$ limits the peak current and sets the amount of time required for charge transfer from the capacitors $C_2$-$C_5$ into the load capacitor $C_L$. The load capacitor $C_L$ may be suitably charged within a single half-cycle of a resonant period of the resonant circuit that includes the load capacitor $C_L$ and the charge circuit inductor $L_2$.

In one or more embodiments, each of the capacitors $C_2$-$C_5$ of the voltage multiplying circuit 14 have a same or substantially same capacitance. For example, each of the capacitors $C_2$-$C_5$ may have an equal capacitance, except for variations that may be attributable to process or temperature spreads, as capacitance values of particular capacitors are dependent on process and temperature spreads. In a case where each of the capacitors $C_2$-$C_5$ of the voltage multiplying circuit 14 has an equal capacitance, the load capacitor $C_L$ is charged to a voltage that is equal to "n" times the DC charging voltage supplied from the DC power supply 13, where "n" is equal to the number of capacitors of the voltage multiplying circuit 14 that are electrically coupled in series (i.e., the input capacitor $C_2$ plus the capacitors of the voltage multiplying stages 15), and the "n" series-connected capacitors have an equivalent capacitance that is equal to the capacitance C of each of the individual capacitors divided by the number "n" of capacitors. The maximum theoretical voltage that the load capacitor $C_L$ can be charged to is given by 2×n×input DC voltage. The load capacitor $C_L$ is charged to a voltage that is between n times the DC charging voltage supplied from the DC power supply 13 and 2*n times the DC charging voltage, depending on a chosen ratio of the capacitance of the load capacitor $C_L$ to the equivalent series capacitance of the capacitors of the voltage multiplying circuit 14, e.g., the equivalent series capacitance of capacitors $C_2$-$C_5$.

After the load capacitor $C_L$ is suitably charged (e.g., within a single half-cycle of the resonant period of the resonant circuit that includes the load capacitor $C_L$ and the charge circuit inductor $L_2$), the first switches $S_2$-$S_4$ of the voltage multiplying circuit 14 and the switch $S_8$ of the charge circuit 16 are simultaneously or concurrently triggered to transition from the conducting state to the non-conducting state, and the second switches $S_5$-$S_7$ are triggered to transition from the non-conducting state to the conducting state. The second switches $S_5$-$S_7$ provide a recharge return path to the recharge circuit 12. For example, the second switches $S_5$-$S_7$ may provide a path to the recharge circuit 12 and to a common ground for each of the capacitors $C_2$-$C_5$ during recharging. Sometime after this, the switch $S_1$ of the recharge circuit 12 is triggered to transition from the non-conducting state to the conducting state. At this time, the diodes $D_2$-$D_4$ are forward biased and the capacitors $C_2$-$C_5$ are resonantly recharged by the capacitor $C_1$ of the recharge circuit 12 through the inductor $L_1$ of the recharge circuit 12. The diode $D_1$ of the recharge circuit 12 acts as a rectifier, preventing charge from flowing back from capacitors $C_2$-$C_5$ into capacitor $C_1$. With the switches $S_2$-$S_4$ and $S_8$ in the non-conducting state, and the switch $S_1$ in the conducting state, the capacitors $C_2$-$C_5$ are electrically coupled in parallel with one another for recharging by the DC power supply 13, or by the capacitor $C_1$ which may be charged from the DC power supply 13. The inductor $L_1$ limits the peak recharge current and sets the amount of time required for charge transfer from the capacitor $C_1$ to the capacitors $C_2$-$C_5$ of the voltage multiplying circuit 14. The diode $D_1$ of the recharge circuit 12 serves as a rectifier, preventing charge from flowing back from the capacitors $C_2$-$C_5$ of the voltage multiplying circuit 14 into the capacitor $C_1$ of the recharge circuit 12. After the capacitors $C_2$-$C_5$ are recharged, the switch $S_1$ is triggered to transition from the conducting state to the non-conducting state. This completes one full charge cycle, and the circuit may be operated as described above to repeat this process indefinitely.

In one or more embodiments, the switch $S_8$ of the charge circuit 16 includes a plurality of switches that are electrically coupled in a series-parallel arrangement. Such an arrangement of multiple switches in series-parallel may increase an effective voltage and a current rating of the switch $S_8$.

In one or more embodiments, one or more of the diodes $D_1$-$D_5$ may be composed of multiple diodes electrically coupled in a series-parallel arrangement, which may increase an effective voltage and a current rating of the diodes $D_1$-$D_5$.

Figure 2:
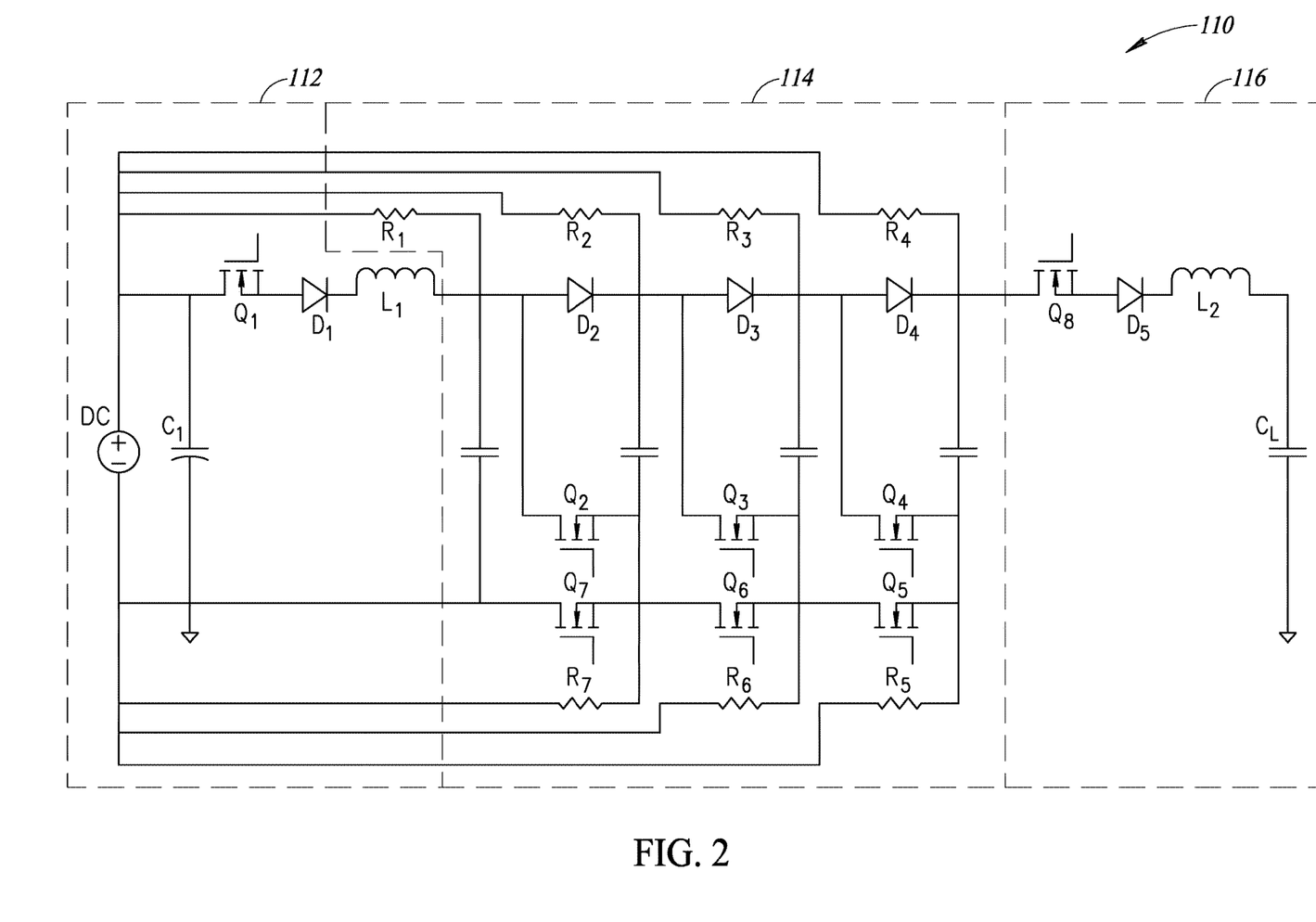
FIG. 2 is a schematic diagram illustrating a resonant pulsed voltage multiplier and capacitor charger including a plurality of resistors for facilitating charging of the capacitors before an initial charge cycle occurs, in accordance with one or more embodiments.

FIG. 2 is a schematic diagram illustrating a resonant pulsed voltage multiplier and capacitor charger 110 including a plurality of resistors $R_1$-$R_7$ for facilitating charging of the capacitors $C_2$-$C_5$ before an initial charge cycle occurs, in accordance with one or more embodiments. The resonant pulsed voltage multiplier and capacitor charger 110 shown in FIG. 2 is similar to the resonant pulsed voltage multiplier and capacitor charger 10 shown in FIG. 1, except for the differences discussed below. In particular, the switches $S_1$-$S_8$ of the resonant pulsed voltage multiplier and capacitor charger 10 shown in FIG. 1 are realized with MOSFETs $Q_1$-$Q_8$ in the resonant pulsed voltage multiplier and capacitor charger 110 of FIG. 2. Additionally, the voltage multiplying circuit 114 of the resonant pulsed voltage multiplier and capacitor charger 110 includes resistors $R_1$-$R_7$, which provide a DC path from each of the capacitors $C_2$-$C_5$ back to the primary capacitor $C_1$ of the recharge circuit 112. The purpose of the resistors $R_1$-$R_7$ is to provide a path by which $C_2$-$C_5$ may be charged before the initial charge cycle occurs. The operation of the resonant pulsed voltage multiplier and capacitor charger 110 depicted in FIG. 2 is otherwise the same as for the resonant pulsed voltage multiplier and capacitor charger 10 shown in FIG. 1.

In the resonant pulsed voltage multiplier and capacitor charger 110 shown in FIG. 2, switching is achieved using MOSFETs $Q_1$-$Q_8$. MOSFETs may preferably be used in one or more embodiments due to their fast turn-on time; however, other switches may be used, including, but not limited to, insulated gate bipolar transistors (IGBTs), thyristors, silicon controlled thyristors, bipolar junction transistors, other field effect transistors, thyratrons, spark gap switches, photoconductive solid state switches, or any solid state, avalanche, optically triggered or gas discharge switches.

FIG. 3 is a schematic diagram illustrating an individual voltage multiplying stage 15, which may be included, for example, in the resonant pulsed voltage multiplier and capacitor charger 10 shown in FIG. 1 and in the resonant pulsed voltage multiplier and capacitor charger 110 shown in FIG. 2. Referring back to FIGS. 1 and 2, each of the resonant pulsed voltage multiplier and capacitor chargers 10, 110 includes three of voltage multiplying stages, providing a multiplication factor at the cathode of diode $D_4$ (i.e., at an output of the voltage multiplying circuits 14, 114) of four. In general, the number of voltage multiplying stages 15 in a resonant pulsed voltage multiplier and capacitor charger may be as many as desired depending on application, from 0 to N stages, where N is the number of voltage multiplying stages 15 required to achieve the desired output voltage.

Figure 4:
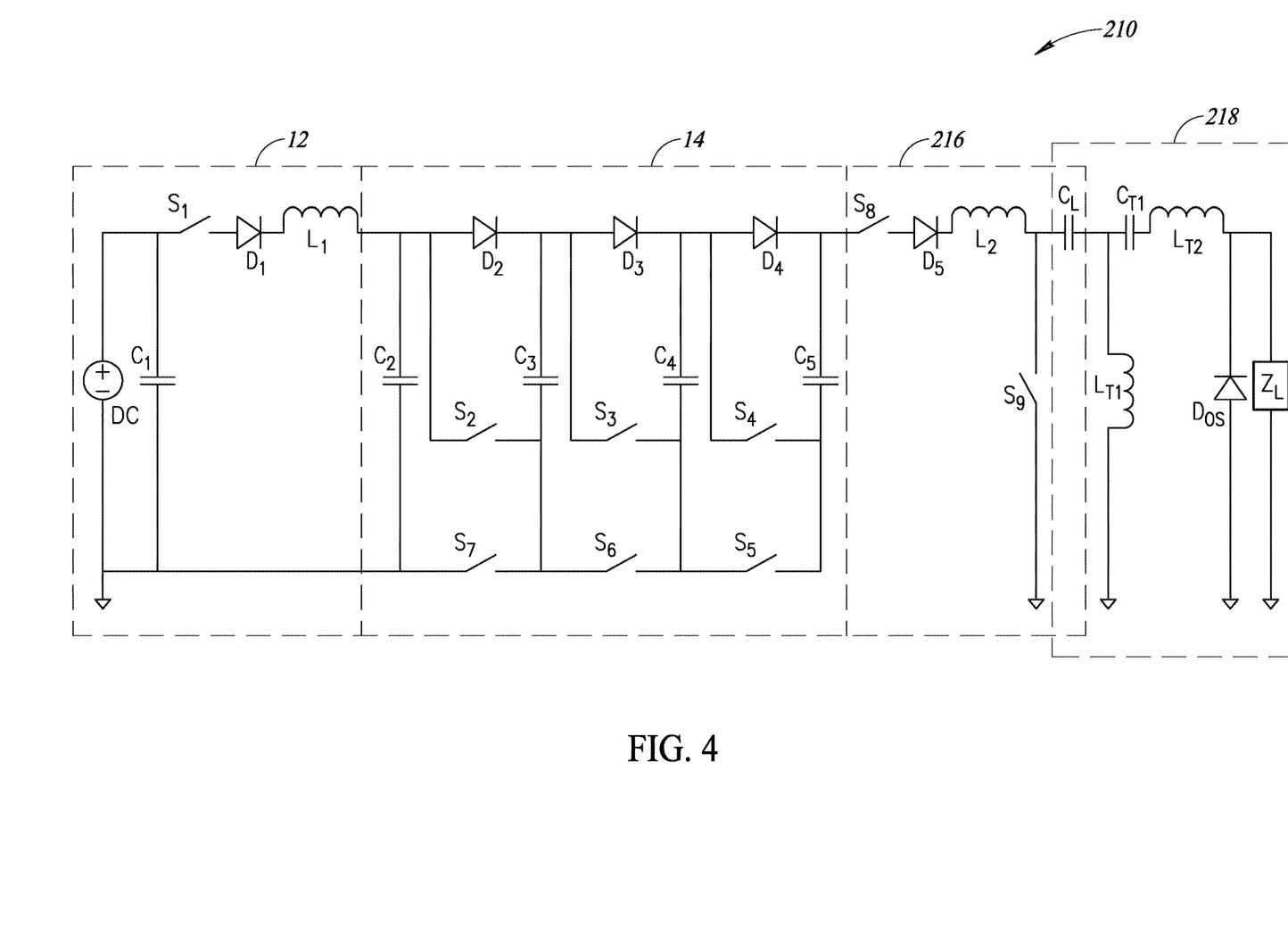
FIG. 4 is a schematic diagram illustrating a resonant pulsed voltage multiplier and capacitor charger electrically coupled to a pulse generator circuit, in accordance with one or more embodiments.

FIG. 4 is a schematic diagram illustrating a resonant pulsed voltage multiplier and capacitor charger 210 electrically coupled to a pulse generator circuit 218, in accordance with one or more embodiments. The resonant pulsed voltage multiplier and capacitor charger 210 may include a recharge circuit 12 and a voltage multiplying circuit 14 that are substantially the same as the recharge circuit 12 and the voltage multiplying circuit 14 shown in FIG. 1. However, in the resonant pulsed voltage multiplier and capacitor charger 210, the load capacitance (i.e., the capacitance of the load capacitor $C_L$) is included in the charge circuit 216, and is also included as a part of a resonant circuit in the pulse generator circuit 218 that is used to drive a diode opening switch $D_{OS}$. Diode opening switches are typically designed to rapidly transition into a non-conducting reversed bias state at a time when electrical current is flowing from cathode to anode through the device. This rapid transition from a conducting to non-conducting state interrupts the current flowing from cathode to anode, and this current is diverted to a load (e.g., as represented by the load impedance $Z_L$), where it creates a fast rising electrical pulse. The voltage amplitude of the pulse is proportional to $i \times Z_L$, where I is the electrical current and $Z_L$ is the load impedance. The resonant pulsed voltage multiplier and capacitor charger 210 provides a circuit structure that is operable to rapidly recharge the diode opening switch $D_{OS}$ circuit, which facilitates achieving a high pulsed repetition rate. It also facilitates achieving higher output voltage from the diode opening switch $D_{OS}$ by enabling the designer to multiply the DC input voltage as desired.

In the implementation shown in FIG. 4, the circuitry (i.e., the resonant pulsed voltage multiplier and capacitor charger 210) that charges the load capacitor $C_L$ operates in the same or substantially same way as described above with respect to the resonant pulsed voltage multiplier and capacitor charger 10 shown in FIG. 1, except that the current that charges the load capacitor $C_L$ flows through the series combination of the load capacitor $C_L$ and a first inductor $L_{T1}$ of the pulse generator circuit 218. The impedance of the first inductor $L_{T1}$ is significantly less than the impedance presented by the series-parallel arrangement of the pulse generator circuit capacitor $C_{T1}$, the second inductor $L_{T2}$, the diode opening switch $D_{OS}$, and the load $Z_L$ on the charging time scale, so a negligible amount of the charging current flows through this alternate path. Once the load capacitor $C_L$ is fully charged, the switch $S_9$ of the pulse generator circuit 218 is triggered from a non-conducting to a conducting state, and the load capacitor $C_L$ is discharged into the resonant circuit that includes the load capacitor $C_L$, the pulse generator circuit capacitor $C_{T1}$, the first inductor $L_{T1}$, and the second inductor $L_{T2}$. The current flowing in this resonant circuit pumps the diode opening switch $D_{OS}$ which produces a high voltage pulse across the load $Z_L$ once the diode opening switch $D_{OS}$ becomes reverse biased.

In one or more embodiments, the pulse may be a nanosecond-scale pulse having a length of equal to or less than 100 nanoseconds at the full-width-at-half-maximum (FHWM) and an amplitude of at least 1 kV. In one or more embodiments, the pulse may have a length within a range of 10 nanoseconds, inclusive, to 10 nanoseconds, inclusive, at the FHWM. In one or more embodiments, the pulse may have an amplitude within a range of 10 kV, inclusive, to 40 kV, inclusive. In some embodiments, the pulse has an amplitude that is greater than 40 kV.

The various embodiments and examples described above are provided by way of illustration only and should not be construed to limit the claimed invention, nor the scope of the various embodiments and examples. Those skilled in the art will readily recognize various modifications and changes that may be made to the claimed invention without following the example embodiments and applications illustrated and described herein, and without departing from the true spirit and scope of the claimed invention, which is set forth in the following claims.

Various structures, articles, and methods described herein may be advantageously employed in specific applications or with other structures, articles, and methods, such as those described in U.S. Provisional Patent Application No. 61/717,044, filed Oct. 22, 2012; U.S. Non-Provisional patent application Ser. No. 14/052,437, filed Oct. 11, 2013 (published as US 2014/0109886); U.S. Provisional Patent Application No. 61/916,693 filed Dec. 16, 2013; U.S. Non-Provisional patent application Ser. No. 14/571,128 filed Dec. 15, 2014 (granted as U.S. Pat. No. 9,617,965); U.S. Non-Provisional patent application Ser. No. 15/444,112, filed Feb. 27, 2017 (published as US 2017/0167464), and U.S. Provisional Application No. 62/620,289, filed Jan. 22, 2018, each of which is incorporated herein by reference in their entireties.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   supplying a DC charging voltage to a plurality of capacitors of a voltage multiplying circuit; and
   resonantly charging a load capacitor of a first resonant circuit that includes the load capacitor and a first inductor to a voltage that is an integer multiple of the DC charging voltage by selectively electrically coupling each of the capacitors of the voltage multiplying circuit in series with one another and with the load capacitor.

2. The method of claim 1 wherein resonantly charging the load capacitor of the first resonant circuit includes resonantly charging the load capacitor of the first resonant circuit within a single half-cycle of a resonant period of the resonant circuit.

3. The method of claim 1 wherein the plurality of capacitors of the voltage multiplying circuit includes n capacitors, each of which have a substantially same capacitance, wherein resonantly charging the load capacitor of the first resonant circuit includes resonantly charging the load capacitor to a voltage that is between n times the DC charging voltage and 2*n times the DC charging voltage, inclusive.

4. The method of claim 1 wherein resonantly charging the load capacitor includes selectively electrically coupling each of the capacitors of the voltage multiplying circuit in series with one another, the load capacitor a switch, an inductor, and a rectifier.

5. The method of claim 4 wherein the rectifier comprises a diode.

6. The method of claim 1, further comprising:
   recharging, by a second resonant circuit, the plurality of capacitors of the voltage multiplying circuit at a time after the resonantly charging the load capacitor of the first resonant circuit.

7. The method of claim 6 wherein the voltage multiplying circuit includes a plurality of diodes and a plurality of switches, the switches operable to selectively couple the plurality of capacitors of the voltage multiplying circuit to one another in series and reverse bias the plurality of diodes during the resonantly charging the load capacitor of the first resonant circuit, the switches further operable to selectively couple the plurality of capacitors of the voltage multiplying circuit to one another in parallel and forward bias the plurality of diodes during the recharging the plurality of capacitors of the voltage multiplying circuit.

8. The method of claim 6 wherein the second resonant circuit includes a switch, a second inductor, and a diode.

9. The method of claim 1 wherein resonantly charging the load capacitor includes resonantly charging the load capacitor to a voltage that is two times the DC charging voltage.

10. The method of claim 1, further comprising:
    discharging the load capacitor into a second resonant circuit;
    driving a diode opening switch by the second resonant circuit to generate an electrical pulse; and
    supplying the electrical pulse to a load electrically coupled in parallel with the diode opening switch.

11. A resonant pulsed voltage multiplier and capacitor charger, comprising:
    a charge circuit including a load capacitance and a charge circuit inductor electrically coupled to one another;
    a voltage multiplying circuit electrically coupled to the charge circuit, the voltage multiplying circuit including a plurality of voltage multiplying stages, each of the plurality of voltage multiplying stages including a capacitor and a first switch, the first switches of the plurality of voltage multiplying stages operable to selectively electrically couple the capacitors of the plurality of voltage multiplying stages in series, and to selectively electrically couple the capacitors of the plurality of voltage multiplying stages in parallel; and
    a recharge circuit electrically coupled to the voltage multiplying circuit, the recharge circuit including a DC power supply operable to supply a DC charging voltage to the capacitors of the plurality of voltage multiplying stages.

12. The resonant pulsed voltage multiplier and capacitor charger of claim 11 wherein each of the plurality of voltage multiplying stages further includes:
    a diode electrically coupled between a first electrode of the capacitor and a first electrode of the first switch, the first switch having a second electrode electrically coupled to a second electrode of the capacitor; and a second switch coupled between the second electrode of the capacitor and a recharge return path to the recharge circuit.

13. The resonant pulsed voltage multiplier and capacitor charger of claim 12 wherein the voltage multiplying circuit further includes an input capacitor having a first electrode electrically coupled to an anode of the diode of a first voltage multiplying stage of the plurality of voltage multiplying stages and a second electrode electrically coupled to the second switch of the first voltage multiplying stage.

14. The resonant pulsed voltage multiplier and capacitor charger of claim 12 wherein a respective diode of the plurality of voltage multiplying stages includes a plurality of diodes electrically coupled to one another in a series-parallel arrangement.

15. The resonant pulsed voltage multiplier and capacitor charger of claim 12 wherein the recharge circuit further includes a recharge circuit switch, a recharge circuit diode, and a recharge circuit inductor, the recharge circuit switch, the recharge circuit diode, and the recharge circuit inductor electrically coupled in series to one another, and the charge circuit further includes a charge circuit switch and a charge circuit diode electrically coupled in series to one another and to the charge circuit inductor, wherein the resonant pulsed voltage multiplier and capacitor charger is operable to:

selectively electrically couple the capacitors of the plurality of voltage multiplying stages in series by transitioning the first switches from a non-conducting state to a conducting state, provide electrical charges from the series-coupled capacitors of the plurality of voltage multiplying stages to the load capacitance by transitioning the charge circuit switch from a non-conducting to a conducting state, and recharge the voltage capacitors of the plurality of voltage multiplying stages by transitioning the first switches of the plurality of voltage multiplying stages and the charge circuit switch from the conducting state to the non-conducting state, and subsequently transitioning the second switches of the plurality of voltage multiplying stages from the non-conducting state to the conducting state.

16. The resonant pulsed voltage multiplier and capacitor charger of claim 15 wherein the charge circuit switch includes a plurality of switches electrically coupled to one another in a series-parallel arrangement, and the charge circuit switch includes at least one of: field effect transistors, insulated gate bipolar transistors, thyristors, silicon controlled thyristors, bipolar junction transistors, photo conductive solid state switches, thyratrons, spark gaps, or any solid state, avalanche, optically triggered or gas discharge switches.

17. The resonant pulsed voltage multiplier and capacitor charger of claim 12 wherein the first switches or the second switches include at least one of: field effect transistors, insulated gate bipolar transistors, thyristors, silicon controlled thyristors, bipolar junction transistors, photo conductive solid state switches, thyratrons, spark gaps, or any solid state, avalanche, optically triggered or gas discharge switches.

18. The resonant pulsed voltage multiplier and capacitor charger of claim 11, further comprising:

a pulse generator circuit electrically coupled to the charge circuit, the pulse generator circuit including:
the load capacitor;
a switch electrically coupled to a first electrode of the load capacitor;
a pulse generator circuit capacitor having a first electrode electrically coupled to a second electrode of the load capacitor;
a first inductor electrically coupled to the second electrode of the load capacitor;
a second inductor having a first electrode electrically coupled to a second electrode of the pulse generator circuit capacitor; and
a diode opening switch electrically coupled to a second electrode of the second inductor.

19. The resonant pulsed voltage multiplier and capacitor charger of claim 18 wherein the switch of the pulse generator circuit includes a plurality of switches electrically coupled to one another in a series-parallel arrangement.

20. The resonant pulsed voltage multiplier and capacitor charger of claim 11 wherein each of the plurality of voltage multiplying stages further includes a first resistor coupled between a first electrode of the DC power supply and a first electrode of the capacitor, and a second resistor coupled between a second electrode of the DC power supply and a second electrode of the capacitor.

* * * * *